United States Patent
Brunner et al.

(12) 
(10) Patent No.: US 6,791,062 B1
(45) Date of Patent: Sep. 14, 2004

(54) METHOD FOR POSITIONING A WELDING TORCH IN THE CENTER-LINE OF THE DESIRED COURSE OF A WELD SEAM

(75) Inventors: Michael Brunner, Seiersberg (AT); Josef Artelsmair, Wartberg/Krems (AT)

(73) Assignee: Fronius International GmbH, Pettenbach (AT)

( * ) Notice: Subject to any disclaimer, the term of this patent is extended or adjusted under 35 U.S.C. 154(b) by 75 days.

(21) Appl. No.: 10/129,687

(22) PCT Filed: Nov. 8, 2000

(86) PCT No.: PCT/AT00/00293

§ 371 (c)(1), (2), (4) Date: Sep. 20, 2002

(87) PCT Pub. No.: WO01/34336

PCT Pub. Date: May 17, 2001

(30) Foreign Application Priority Data

Nov. 8, 1999 (AT) .............................................. 1887/99

(51) Int. Cl.[7] .............................................. B23K 9/127
(52) U.S. Cl. .................................... 219/124.34; 901/42
(58) Field of Search ...................... 219/124.34, 130.21, 219/130.4; 901/42

(56) References Cited

U.S. PATENT DOCUMENTS 2,936,364 A * 5/1960 Skinner .................... 219/130.4
4,249,062 A   2/1981 Hozumi et al.
4,935,597 A   6/1990 Zimmer
5,206,474 A * 4/1993 Fukuoka et al. ....... 219/124.34
5,264,677 A * 11/1993 Sato et al. ............. 219/124.34
5,650,079 A * 7/1997 Shimogama et al. .. 219/130.21
5,780,808 A   7/1998 Moon

FOREIGN PATENT DOCUMENTS

| DE | 35 45 505 | 6/1987 |
| DE | 298 16 729 | 2/1999 |
| GB | 2 268 009 | 12/1993 |
| JP | 64-31574 | * 2/1989 |

OTHER PUBLICATIONS

Geroge E. Cook, "Robotic Arc Welding: Research in Sensory Feedback Control", IEEE Transaction on Industrial Electronics, Nr. 30, Aug. 1983, pp. 252–268, XP002163532.

* cited by examiner

Primary Examiner—Clifford C. Shaw
(74) Attorney, Agent, or Firm—Collard & Roe, P.C.

(57) ABSTRACT

The invention describes a method of positioning a welding torch (10) and a welding wire (13) at the center of a seam (32). The welding torch (10) is positioned by means of a robot arm on a predetermined or programmed position between two seam edges (34, 35), after which an alignment process is run whereby the robot arm moves the welding torch (10) in one direction until a short circuit occurs between the welding torch (10) or the welding wire (13) and a seam edge (34, 35) of the workpiece (16), and the welding torch (10) is then displaced in the opposite direction by the robot arm until another short circuit occurs between the welding torch (10) or the welding wire (13) and another side seam edge (34, 35) of the workpiece (16). A control system (4) then evaluates the displacement path in order to calculate a seam center, on which the welding torch (10) is positioned. No additional hardware components are needed in order to implement the method.

9 Claims, 3 Drawing Sheets

METHOD FOR POSITIONING A WELDING TORCH IN THE CENTER-LINE OF THE DESIRED COURSE OF A WELD SEAM

CROSS REFERENCE TO RELATED APPLICATIONS

Applicants claim priority under 35 U.S.C. §119 of Austrian Application No. A 1887/99, fled on Nov. 8, 1999. Applicants also claim priority under 35 U.S.C. §365 of PCT/AT00/00293, filed on Nov. 8, 2000. The international application under PCT article 21(2) was not published in English.

The invention relates to a method of positioning a welding torch with a welding wire at the center of a desired path of a welding seam, and a method of detecting a short circuit between the welding wire and a workpiece on completion of a welding process, as well as a welding device for a robot application.

A method is known from U.S. Pat. No. 4,249,062 A, in which a switching element of a control system activates a sub-routine to operate a changeover from one energy source or welding current source to another energy source or voltage source. The positioning process to determine the seam centre is then operated by means of this energy source. On completion of the sub-routine, the switching element is switched back so that a welding process can now be run with the welding current source. The disadvantage of this system is that an additional current source and a switching element must be provided for determining the coordinates of the seam and a changeover has to be operated between the two energy sources depending on the process being run.

A method and a device for positioning a welding torch at the centre of a seam is known from patent specification DE 35 45 505 A1, in which the welding torch is positioned on a predetermined or programmed seam centre by a robot arm, which is followed by an alignment process. The robot arm displaces the welding torch in one direction until a short circuit occurs between the welding torch, in particular a gas nozzle, and a seam edge of the workpiece and the robot arm then moves the welding torch in the opposite direction until another short circuit occurs between the welding torch, in particular the gas nozzle, and the workpiece. A control system then evaluates the displacement path to work out a seam mid-point on which the welding torch will be positioned by the robot. The contour of the workpiece is mechanically scanned by sensing the contact between the adjacent seam edges of the seam reference point of a workpiece and the coordinates of the seam root point are computed from this data and from the displacement path. To this end, the welding torch is pivotably mounted on the robot arm and has a switch plate which lifts on contact with the seam edge, pivoting the welding torch pipe out from the welding torch, and a switching signal is transmitted to the control system.

The disadvantage of this system is that the welding torch has to be specially designed to be able to determine the coordinates mechanically, which means that not every welding torch can be used for this purpose.

Another method and a device for mechanically determining the coordinates of a seam centre is known from patent specification DE 298 16 729 U1, in which an auxiliary current source is activated by a control system. The output of the auxiliary current source is defined so that, when a short circuit occurs between the welding wire and the workpiece or welding seam edge, an arc is not struck when the alignment process is taking place. The coordinates are determined, also by displacing the welding torch and the welding wire to the left and right accordingly, so that when a short circuit occurs between the welding wire and the workpiece, a switching device, in particular a relay, is activated and an indication that a short circuit has occurred is transmitted to the control system via the switching element coupled with the switching system. The welding torch and the welding wire are then displaced in the opposite direction. The coordinates of the seam centre can then be calculated.

The disadvantage of this system is that an additional auxiliary current source is needed in order to determine the coordinates of the seam and is provided in the form of an add-on component to the welding device, which means that an extra switching device is needed in order to provide a connection to the welding device.

The underlying objective of the invention is to propose a method for positioning a welding torch and a welding wire in the middle of a desired run of welding seam and a method for detecting a short circuit between workpiece and welding wire on completion of a welding process, as well as a welding device or a welding system for a robot application, in which the alignment can be found without the need for additional devices or components.

In a method of positioning a welding torch and a welding wire of a welding device at a center of a desired path of a welding seam, in which the welding torch is positioned by means of a robot arm on a predetermined or programmed position between two seam edges of a workpiece and an alignment process is run whereby the robot arm moves the welding torch in one direction until a short circuit occurs between the welding torch or the welding wire and one of the seam edges, and the welding torch is then displaced by the robot arm in the opposite direction until another short circuit occurs between the welding torch or the welding wire and the other one of the seam edges but no arc is ignited between the welding torch or welding wire and the workpiece when a short circuit occurs, after which a control system evaluates the displacement path in order to calculate the seam center on which the welding torch or welding wire is positioned by the robot arm, the present invention uses a single current source having a power component supplying cower for the welding process and the alignment process, the control system reduces the power output of the power component by selecting a "Find position" function to the degree that a chance of resistance is detected on the basis of the power applied to output terminals of the power component when a short circuit occurs and, to detect the short circuit, discharge capacitors between the output terminals and of the power component are loaded by an output power of the power component with a low capacity so that ignition of an arc is prevented when a short circuit occurs.

The advantage of this system method is that by controlling the power component of the welding device accordingly, the output power can be reduced so that no arc is struck when the welding wire comes into contact with the workpiece, obviating the need for additional devices or components, such as an auxiliary current source. Another advantage resides in the fact that the user or welder can activate the power component automatically, simply by activating a function, and welding parameters already set up for a welding process will not be lost and the welding process can therefore be initiated after the alignment process. Another advantage is that by reducing the output power of the power component, in particular a bridge circuit, the pulse width is already so small that it prevents an arc being inadvertently ignited when a short circuit occurs. The power supply of a secondary circuit is set up in such a way that the power lost by the components is compensated and only a low charge is applied to the suppression and/or discharge capacitors disposed on the output terminals.

This ensures that only a small quantity of energy is provided for the purpose of detecting a change in resistance or a short circuit. Another significant advantage is the fact that this method of activating the power component can be operated by appropriate software programmes and the system can therefore be operated with older welding devices, simply by updating the software.

According to another aspect, this invention provides a method of detecting a short circuit between a welding wire and a workpiece on completion of a welding process, a no-load voltage being applied to the welding wire, which breaks down in case of a short current, and the break down being detected by a control system, wherein the welding device uses a single current source having a power component supplying power for the welding process and for detecting a short circuit on completion of the welding process, the power component is activated by the control system on completion of the welding process and after a predeterminable time has elapsed so that, when the short circuit is detected between the welding wire and the workpiece, a minimal output power is supplied or the power component is switched off, thereby preventing ignition of an arc and, to detect the short circuit, discharge capacitors between the output terminals are loaded by an output power of the power component with a low capacity so that ignition of an arc is prevented when a short circuit occurs.

The advantage of this approach is that by minimizing the output power when checking for a change in resistance or a short circuit at the end of the welding process, no damage can be caused to the workpiece and the welding wire, because ignition of an arc is prevented or is not possible. Another advantage resides in the fact that the minimal output power applied during a checking process means that persons working with the welding torch or workpiece are not at risk.

The invention comprises a welding torch and a welding wire, a robot arm carrying the welding torch for positioning the welding torch and welding wire on a predetermined or programmed position between two seam edges of a workpiece in an alignment process in which the robot arm moves the welding torch in one direction until a short circuit occurs between the welding torch or the welding wire and one of the seam edges, and the welding torch is then displaced by the robot arm in the opposite direction until another short circuit occurs between the welding torch or the welding wire and the other one of the seam edges but no arc is ignited between the welding torch or welding wire and the workpiece when a short circuit occurs; a single current source having a power component supplying power for the welding process and the alignment process; a controllable "Find position"function controlling the power component with a minimal output power when a short circuit occurs and ignition of an arc is prevented; and, to detect the short circuit, discharge capacitors connected to output terminals of the power component at a secondary side of the current source, the discharge capacitors being loadable by an output power of the power component with a low capacity whereby ignition of an arc is prevented when a short circuit occurs.

The advantage here is that, simply by setting and activating a function and a welding parameter, the power component can be controlled separately by the control system. A function of this type can easily be set up to run with existing welding devices because it can be achieved simply by a software update, requiring no modifications of the hardware.

The invention will be described in more detail with reference to examples of embodiments. Of the drawings.

Firstly, it should be pointed out that same parts of the individual embodiments given as examples are denoted by the same reference numbers. The details relating to position given in respect of the individual examples of embodiments may be transposed in terms of meaning to the new position where a different position is being described.

Figure 1:
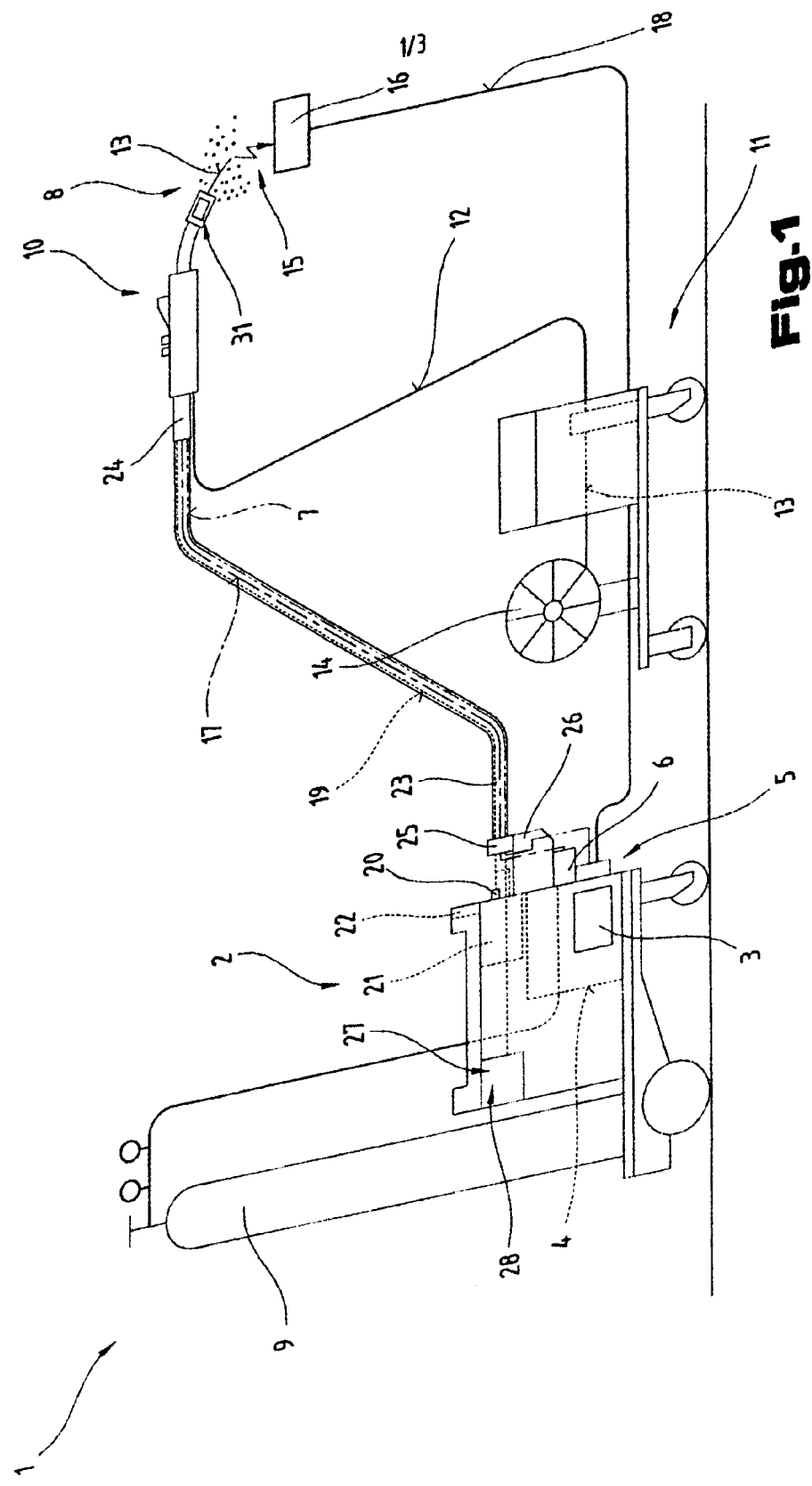
FIG. 1 is a simplified schematic diagram of a welding machine and a welding device.

FIG. 1 illustrates a welding system and a welding device 1 for a whole range of welding processes, e.g. MIG-MAG welding and TIG welding or electrode welding processes.

The welding device 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding device 1, in particular to the current source 2, via another supply line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire to be cooled.

The welding device 1 also has an input and/or output device 22, by means of which a whole range of settings can be entered for welding parameters and operating modes of the welding device 1. The welding parameters entered at the input and/or output device 22 are then forwarded to the control system 4, from where they are applied to the individual components of the welding system and the welding device 1.

In the embodiment illustrated as an example here, the welding torch 10 is also connected to the welding device 1 and the welding system by means of a hose pack 23. The individual lines from the welding device 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

Figure 2:
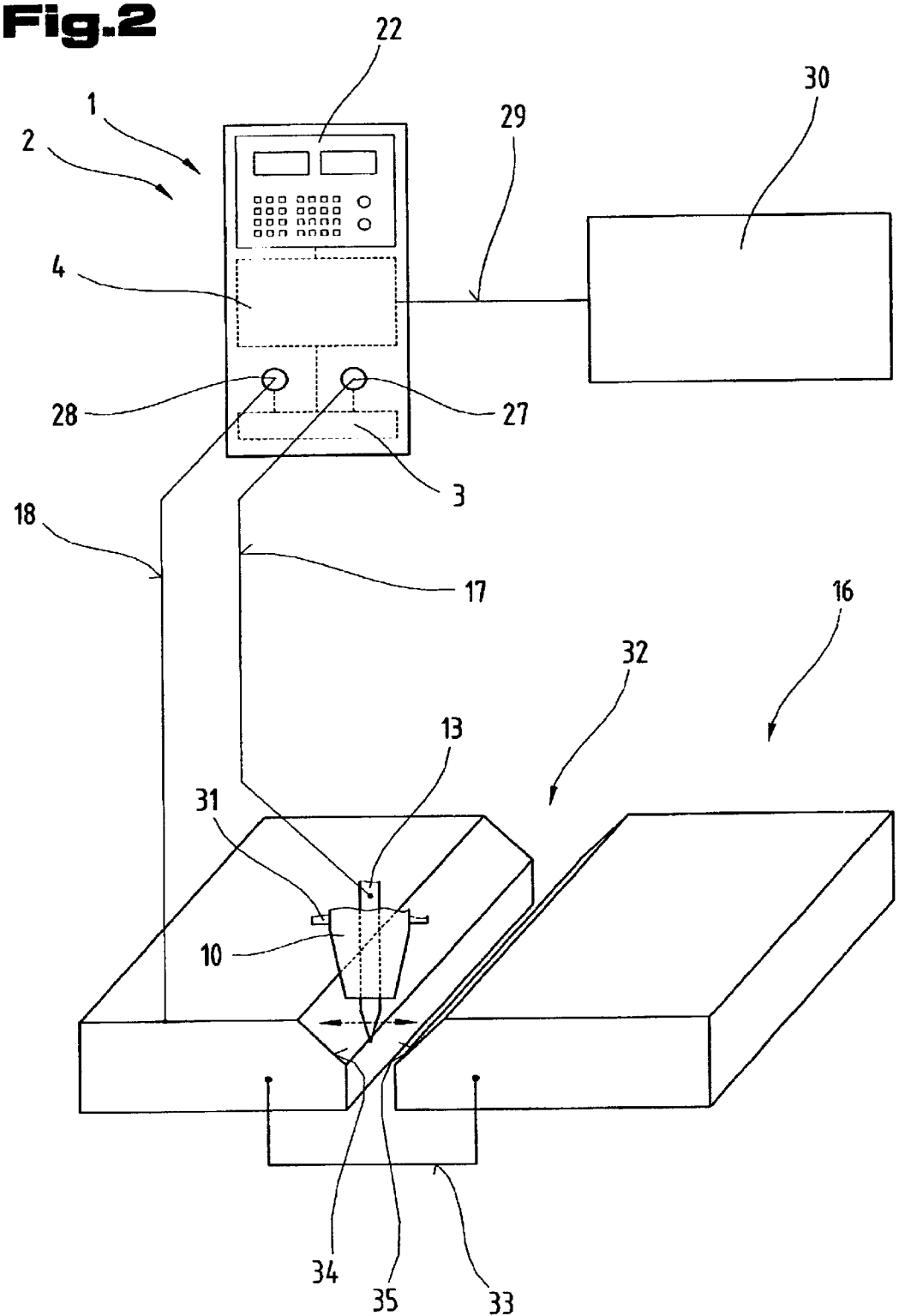
FIG. 2 is a simplified, schematic diagram of a robot application with the welding device proposed by the invention.
Figure 3:
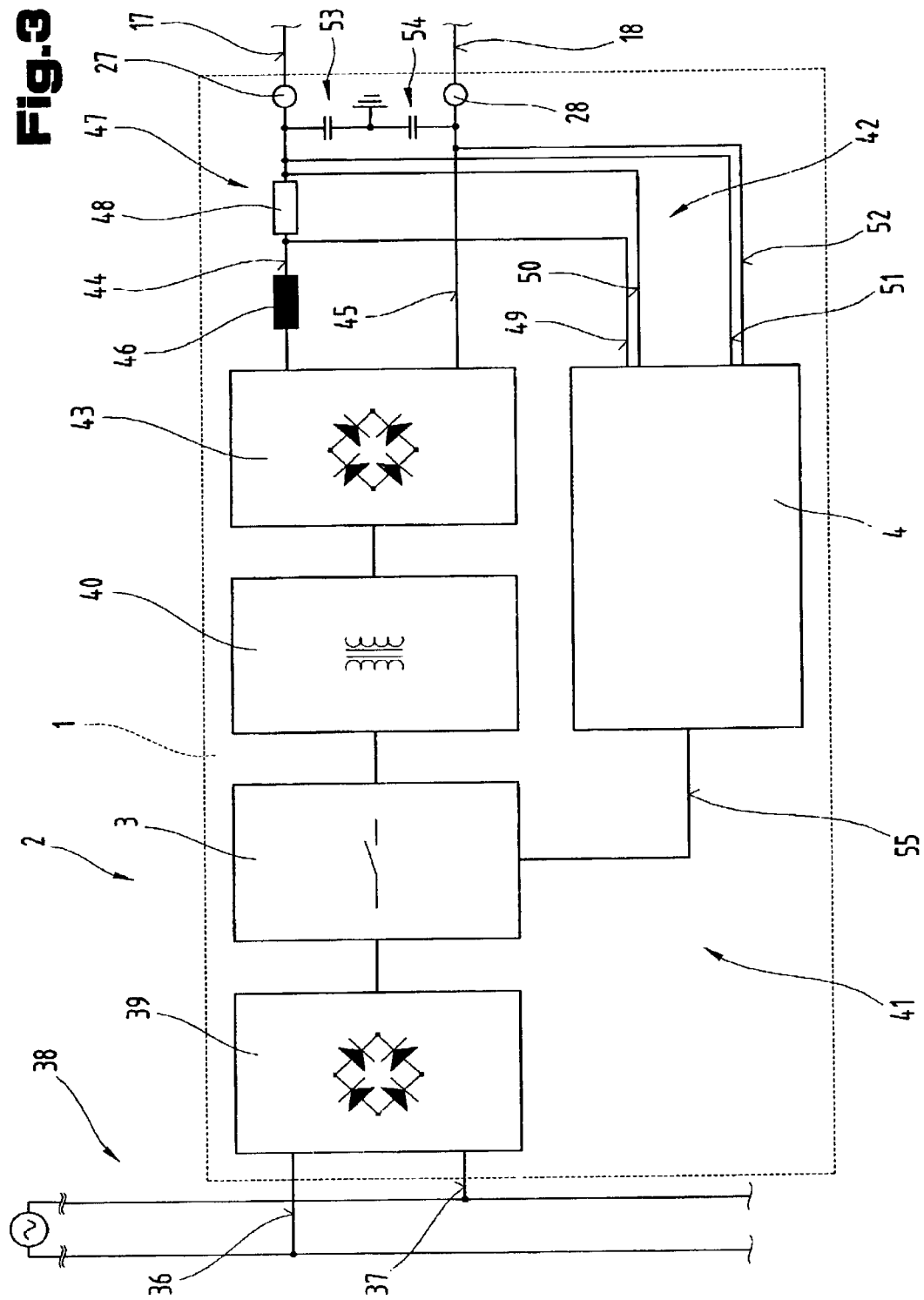
FIG. 3 is a simplified schematic illustration showing a block diagram of the welding device.

FIGS. 2 and 3 provide a schematic illustration of the structure of a welding system with the welding device 1 and a robot application, in particular a welding robot, which is illustrated in a schematic manner only so as to preserve clarity, and a block diagram of the welding device 1. The welding device 1 illustrated here has the individual components described in relation to FIG. 1. As schematically indicated in FIG. 2, the control system 4 is connected to the power component 3 for the welding process and to the input and/or output device 22, thereby enabling a welding process to be set up, controlled and regulated.

The power component 3 of the welding device I, which is preferably provided in the form of a current source 2, in particular a current-inverter source, is connected via output terminals 27, 28 to the welding lines 17, 18 to supply energy to the welding torch 10, in particular to the welding wire 13. In order to set up a current circuit for a welding process, the schematically illustrated welding torch 10, in particular the welding wire 13, is connected to the welding line 17, whilst the workpiece 16 is connected to welding line 18, so that an arc 15 can he struck between the welding wire 13 and the workpiece 16 when energy is applied by the power component 3, thereby enable a welding process to be carried out and a weld seam to be formed. The ignition process and how the welding process is controlled and regulated will not be described in further detail, since these processes are all known from the prior art.

The welding device 1 is also connected via a line 29 to a schematically indicated robot controller 30. All possible types of connection known from the prior art may be used for this purpose, such as a field bus, an optical fibre link, etc., it being possible to operate a two-way data transmission across the line 29. The function of the robot controller 30 is to control the individual components, such as a robot arm, a robot head 31 or manipulator, fur example, as schematically indicated.

The invention proposes a method whereby the welding device 1 is used to position the welding torch 10 and the welding wire 13 at the centre of a seam 32 by means of a mechanical alignment process without requiring any additional hardware components. This being the case, the welding torch 10 is positioned by a robot arm on a predetermined or programmed position between two seam edges, as illustrated in FIG. 2. The alignment process which is then run will be described only briefly because it is already known from the prior art and is described in detail in patent specifications DE 298 16 729 U1 and DE 35 45 505 A1, for example. This alignment process is operated by mechanically determining the position of a seam centre of the seam 32, schematically indicated on the workpiece 16.

In the embodiment given as an example here, however, the workpiece consists of two separate components and it is therefore necessary to set up an electrical line connection 33 between the two individual components.

In order to determine the seam centre during the mechanical alignment process, the welding device 1 is required to co-operate with the robot controller 30, because the components of the robot can not be activated directly from the welding device 1. Naturally, it would also be possible to run the alignment process from the welding device 1, in particular from the control system 4, although care needs to be taken to ensure that the control system 4 of the welding device 1 is capable of assuming control of the robot components.

During the mechanical alignment process, the welding torch 10, once positioned in the region of the seam 32, is moved by the robot arm in one direction until a change in resistance, in particular a short circuit, occurs between the welding wire 13 and a seam edge 34 of the workpiece 16. This change in resistance is detected due to the fact that energy or power is applied accordingly between the welding wire 13 and the workpiece 16 so that when the welding wire 13 comes into contact with the workpiece 16, a change occurs in the energy, in particular a change in voltage and/or a change in current, which can he detected by the control system 4.

The welding torch 10 together with the welding wire 13 is then moved in the opposite direction until another change in resistance occurs, in particular another short circuit, between the welding wire 13 and another seam edge 35, as indicated by the arrows shown in broken lines in FIG. 2. After the first change in resistance, a path measurement is activated by the robot controller 30 so that when another change in resistance occurs, a seam centre can be calculated by the robot controller by evaluating the displacement path or path measurement, after which the welding torch 10 and the welding wire 13 are positioned by the robot on the newly computed coordinates at the seam centre of the seam 32 and a welding process can be started. Alternatively, however, the path measurement could he operated by timing the displacement path at a known displacement speed.

In principle, the alignment process is based on determining and calculating a mid-point between two seam edges 34, 35 of a seam by a mechanical displacement of the robot and the robot head 31 so that a welding process can be run by means of the robot, the rest of the seam-forming procedure, schematically indicated by arrow 36, being pre-set by programming the robot and the robot controller 32.

However, in a configuration such as illustrated in FIG. 2, if a welding device 1 of a type known from the prior art is used, the first change in resistance between the welding wire 13 and the workpiece 16 would be perceived by the control system 4 as being a short circuit and an ignition process would then be initiated in order to ignite the arc 15, causing the welding wire 13 to melt, in which case it would no longer be possible to determine the exact centre of the seam 32.

In the case of the welding device 1 proposed by the invention, an alignment process of this type can be operated with the power component 3 of the welding device I, without the need for additional devices or components and obviating the need for the additional devices or add-on components required with the prior art methods such as an auxiliary current source, for example.

To this end, the welder or user sets an additional function from the input and/or output device 22, in particular the position-finding function, and the other welding parameters for the welding process to be run, such as the current level, the wire feed rate, the gas mixture etc., are also entered via the input and/or output device 22. Accordingly, the "Find position" function for controlling the current source 2 and the power component 3 of the welding device 1 can be provided on the welding device 1 or on the current source 2, in particular on the input and/or output device 22, from where it can be set to discharge a minimised output power that will not cause an arc 15 to be struck when a change in resistance or a short circuit occurs between the welding wire 13 and the workpiece 16.

When the position-finding function is selected, the other welding parameters entered by the user to set up a high output power from the power component 3 for a welding process are held in memory but the current source 2 and the power component 3 of the welding device 1 are activated by the control system 4 in such a way that when a change in resistance occurs between the welding wire 13 and the workpiece 16, a minimal output power is supplied or the power component 3 is switched off. As a result, when a short circuit occurs, the arc 15 is prevented or suppressed. This is necessary because, with all the welding devices 1 known from the prior art, whenever a change in resistance occurs, which is tantamount to a short circuit between the welding wire 13 and the workpiece 16, the power components 3 of the welding devices 1 try to eliminate the short circuit that has occurred and therefore apply a significant increase in current.

However, precisely when the alignment process for positioning the welding torch 10 in the seam centre is being run, the welding wire 13 is melted in the end region, causing different distances of the welding wire 13 from the workpiece surface and it is no longer possible to determine and calculate the seam centre. Using the welding device 1 proposed by the invention and activating the power component 3 of the welding device 1 accordingly, it is now possible to run the alignment process described above using the power component 3 of the welding device 1, because the arc 15 can be prevented from igniting by duly reducing the output power on mechanical contact of the workpiece surface, in other words a short circuit.

The major advantage of this system is that there is no longer any need for additional auxiliary current sources or other components because the power component 3 is activated by an appropriate activation process stored in a memory of the control system 4, enabling the alignment process and a welding process to be operated with the power component 3 of the welding device 1. Consequently, all welding devices 1 can be used with a solution of the type used for robot applications as proposed by the invention without having to add new or modify existing hardware.

Various methods may be used to detect a change in resistance between the welding wire 13 and the workpiece 16. For example, the voltage or current at the output terminals 27, 28 may be monitored or reference values could be stored for voltage and current, in other words for a resistance calculation, making detection possible with whatever monitoring method is used. This function will not he described in further detail, since a procedure for monitoring the welding process is already provided in every welding device 1 and the change in resistance can be detected by the control system 4 by means of a simple desired/actual comparison of the current and/or the voltage, for example, i.e. when the welding device 1 or the power component 3 is activated, a no-load voltage is applied to the welding wire 13 so that when a change in resistance occurs, in other words a short circuit, the power component 3 is activated so that the output power applied to the output terminals 27, 28 is adjusted to a minimal level which does not permit ignition of an arc 15 and arc-formation is prevented by turning off the power component 3. Another option would he to run an appropriate activation process for the power component 3, in which the power component 3 applies a power or initial power to the output terminals 27, 28 such that tie arc 15 call not be ignited.

Using the option of activating the power component 3 of the welding device 1 in this way means that once a start signal has been transmitted to the robot controller 30, the alignment process can be run. The robot controller 30 and the robot then perform the mechanical alignment described above by moving the welding torch 10 in the direction of the seam edges 34 or 35, so that when the first change in resistance is detected, another signal is sent from the control system 4 to the robot controller 30, whereupon the direction of displacement of the welding torch 10 is reversed. Once the alignment process has been completed, a signal is duly sent from the robot controller 30 to the control system 4 of ht welding device 1, so that when another change in resistance, in particular a short circuit, occurs, the welding process can be started by the user with the set welding parameters.

Naturally, instead of using contact ignition, it would also be possible to start a welding process by means of a high-frequency ignition. To this end, however, it will be necessary for a start signal to be sent from the robot controller 30 to the control system 4 so a defined welding process can be initiated in a defined mariner at a defined position of the seam 32 and the workpiece 16, whereby, once the alignment process has been completed, the control system 4 activates the power component 3 on the basis of the welding parameters previously entered by the welder or user in order to increase the output power in readiness for a welding process.

Naturally, by configuring or activating the power component 3 of the welding device 1 in this way, other processes can also be run which may not be operated whilst an arc 15 is ignited. For this purpose, a process of detecting the contour of the workpiece 16 can he used to control the height of the welding wire 13 from the surface of the workpiece 16. In another option, computations can he run by the control system 4 and the results can then be transmitted to the robot controller 30 for positioning the welding torch 10. This can be done by calculating the time which elapses between two changes in resistance at a predetermined robot speed.

As may be seen more clearly from FIG. 3, the welding device 1 is made up of individual components, although only the key elements are illustrated in the form of a block diagram in order to retain clarity.

The welding device 1 is connected to a mains supply 38 via supply lines 36, 37. A rectifier bridge 39 is supplied with power via the supply lines 36, 37, the purpose of the rectifier bridge 39 being to rectify the alternating voltage delivered by the mains supply 38. The power component 3 is connected to the rectifier bridge 39 and the power component 3 may be provided in the form of a bridge circuit and/or a boost chopper or buck chopper. The direct voltage delivered by the rectifier bridge 39 is transformed accordingly in the power component 3.

A transformer 40 is connected to the power component 3 in order to obtain a galvanic separation, in particular into a primary side 41 and a secondary side 42, to set up the welding device 1. The elements and components described above are disposed on the primary side 41 of the transformer 40. Any circuit components known from the prior art may be connected to the secondary side 42 of the transformer 40. In the embodiment illustrated as an example here, another rectifier bridge 43 is provided on the secondary side 42 of the transformer 40, to which the output terminals 27, 28 are connected via lines 44, 45. A choke 46 and a measuring device 47 for determining the current and the voltage are disposed in the line 44, the measuring device 47 being provided in the form of a current sensor 48 for detecting the current.

In order to connect the current and the voltage at the output of the output terminals 27, 28 into the process regulation and process control system, the control system 4 of the welding device 1 is connected via lines 49 to 52 to the lines 44, 45, lines 49, 50 being responsible for the current actual value and lines 51, 52 being responsible for the voltage actual value. Suppression and/or discharge capacitors 53, 54 are also disposed between the output terminals 27, 28 so that a direct voltage for the welding process can be drawn from the output terminals 27, 28. The suppression and/or discharge capacitors 53, 54, connected in series, have a low capacity and the mid-point of the two suppression and/or discharge capacitors 53, 54 may be applied to a potential of the welding device 1, in particular a ground potential, or be connected thereto. In order to run a welding process, the welding torch 10 is connected via the welding line 17 to the output terminal 27 and the workpiece 16 is connected via the supply line 18 to the welding device 1, as may be seen by referring to FIGS. 1 and 3 in conjunction with one another.

The direct voltage supplied by the rectifier bridge 39 is chopped in the power component 3 and energy can be transferred across the transformer 40. In order to activate the power component 3, it is connected via a line 55 to the control system 4. It should be pointed out that other component groups or circuit elements such as a short circuit detection system, etc., for example, may be added. In order to retain clarity, these are not illustrated. The individual connections between the component groups are indicated on a schematic basis only.

A welding device 1 is supplied with energy for a welding process and to supply the arc 15 by means of control pulses transmitted from the control system 4 to the power component 3 so that the energy supplied to the power component 3 by the rectifier bridge 39 can be chopped from a direct voltage generated by a bridge circuit and forwarded to the transformer 40 in individual pulses. This enables a desired quantity of energy to be transmitted to the secondary side 42. The pulses received at the secondary side 42, in particular in the form of an alternating voltage, are in turn rectified by the rectifier bridge 43 and then applied to the output terminals 27, 28 and the welding torch 10, the suppression and/or discharge capacitors 53, 54 being simultaneously charged and powered. An energy supply of this type and a circuit structure of this type is used with MIG/MAG welding devices, for example.

In order to be able to control the power component 3 depending on the status of the welding process, the current actual values and the voltage actual values are detected via lines 49 to 52 and forwarded to the control system 4, i.e. when a change in resistance or a short circuit occurs between the welding wire 13 and the workpiece 16, it is detected due to an interruption of the voltage or by a corresponding current flow, whereupon the control system 4 changes activation of the power component 3 to resolve the short circuit. This being the case, the control pulses, in particular the pulse width for the bridge circuit in the power component 3, is increased by the control system 4 so that a very high current is applied to the output terminals 27, 28 and the short circuit is resolved accordingly.

In order to be able to run a process for positioning a welding torch 10 and a welding wire 13 at the centre of a seam by means of the welding device 1, as described above, the power component 3, which also supplies the power or energy for the welding process, must be activated accordingly by the control system 4. If using a welding device 1 known from the prior art, whenever a change in resistance or a short circuit occurs, the pulse width for the bridge circuit in the power component 3 is increased so that a very high current is applied in order to eliminate the short circuit and the pulse width at no load is adjusted so that a correspondingly rated power is available. Consequently, with this welding device, the power component is already be activated at no-load with a corresponding pulse width, which means that an arc can not be suppressed or prevented in the event of a short circuit. Also, in order to run such a process using the prior art methods, welding devices use another current source with a lower power and the power component 3 is therefore not used.

When using the welding device 1 proposed by the invention, the power component 3 is used to run a process of positioning the welding torch 10 and the welding wire 13 and to this end a control function is selected, in particular a position-finding function, by means of which the output terminals 27, 28 and the suppression and/or discharge capacitors 53, 54 connected between the output terminals 27, 28 of the welding device 1 are activated or charged with pulses by the power component 3, which also supplies the power for the welding process, in such a way that when a change in resistance occurs, in particular a short circuit, between the welding wire 13 and the workpiece 16, an arc 15 is prevented from being ignited or is suppressed or the power component 3 of the welding device 1 is switched off when the resistance changes or a short circuit occurs. It is necessary to be able to detect the short circuit very rapidly for this purpose so that the power component 3 can be disconnected by the transformer 40 or the pulse width set to zero immediately a change in resistance or a short circuit is detected. This being the case, however, the power component 3 must be switched off for a certain period during the alignment process so that a short circuit detection operation can be run to detect the other short circuit needed in order to find the seam centre.

When the position-finding function is selected, the control pulses, in particular the pulse width, for the power component 3 are reduced by the control system 4 so that the lost power occurring at the components on the secondary side 42 is at least compensated, i.e. the energy or power supplied by the power component 3 is sufficient to compensate for the losses or slightly charge the suppression and/or discharge capacitors 53, 54. As a result, the suppression and/or discharge capacitors 53, 54 are maintained in a charged state and a change in resistance or a short circuit can therefore be detected because the suppression and/or discharge capacitors 53, 54 are charged with a corresponding quantity of energy or power and this power and the power from the power component 3 can be forwarded to the welding torch 10 by a change in resistance. However, because the power component 3 applies only a low power to maintain the charged state, it can not cause an arc 15 to ignite when the welding wire 13 comes into contact with the workpiece 16 or if the welding wire 13 comes loose from the workpiece 16, as a result of which the internal power component 3 of the welding device 1 can be used to run a positioning operation of the welding torch 10 as described.

To enable a corresponding mechanical alignment process to be run, of the type known from the prior art and as described above, it is necessary to set up a two-way data exchange between the control system 4 and the robot controller 30 because the change in resistance or the short circuit must be detected by the welding device 1, in particular by the control system 4, in order to reverse the direction of the welding torch displacement and to terminate the alignment process. The robot controller 30, on the other hand, must be able to indicate to the control system 4 when a welding process must be started and the alignment process is terminated so that the pulses and the output power can be raised by the control system 4 to the level necessary to strike the arc 15 and supply the power needed for the welding process, i.e. the pulse width is increased accordingly to form a high output power and the power component 3 can therefore be activated in readiness for a welding process.

Once the alignment process and the subsequent welding process have been completed, a wire check is run by the control system 4. This involves, on completion of the welding process, after a pre-settable time has elapsed, activating the power component 3 as if for the alignment process, i.e. the power or output power of the power component 3 is reduced to the degree that the power losses of the components are eliminated and only a slight charge is applied to the suppression and/or discharge capacitors 53,54, so that a change in resistance or a short circuit of the welding wire 13 with the workpiece 16 can be safely operated without striking or igniting an arc 15. Tie control system 4 will now be able to detect whether the welding wire 13 has fused with the weld seam or not on completion of the welding process. This can be detected due to the fact that, because of the inertia of the wire feed device 11, the welding wire 13 can be conveyed further on completion of the welding process and the welding wire 13 immersed in the melt by a robotic displacement and the welding wire 13 will cause a short circuit as it adheres to the solidifying melt of the deposited metal.

The detection system operates on the basis of applying the no-load voltage to the welding wire 13 for a certain, pre-settable time. If a current flow occurs, i.e. the welding wire 13 is fused with the deposited metal and the no-load voltage breaks down because of the short circuit, which can be detected by the control system 4 or a current flow can be detected by means of the measuring device 47, and a fault signal can be issued by the welding device 1 or a signal transmitted to the robot controller 30 to halt the displacement.

Once the short circuit has been detected by the control system 4, a correspondingly high current can be applied to the welding wire 13 to release this connection, so that the short circuit or connection is resolved and the user separates the welding wire 13 mechanically. To this end, the wire may be checked several times on the run.

The significant advantage of a system which detects whether there is a short circuit at the end of the welding process is that, because the output power is low, as during the alignment process, there can be no consequential damage. Another advantage resides in the fact that persons already working with the welding torch 10 and the workpiece 16 are not exposed to any risk because activation of the power component 3 is run at a minimal output power which does not endanger humans.

The option of activating the power component 3 in this mode can be used to run other processes in which the welding wire 13 must be in contact with the workpiece 16 without igniting or striking an arc 15 or in situations where there is a risk of contact. One such example is controlling the welding wire 13 as it emerges from the contact pipe, for which purpose the welding wire 13 is run along the workpiece 16 and then moved back across a predetermined distance by the wire feed so that the welding wire 13 forms a defined distance from the workpiece surface. When running a process of this type, care must be taken to ensure that no arc can be produced which will melt the welding wire.

Another option is to use the method described above on a welding device 1 without the suppression and/or discharge capacitors 53, 54. In this case, the power component 3 is activated in the same way as if the suppression and/or discharge capacitors 53, 54 were used but a pulse-type voltage is set at the output terminals 27. 28, timed to coincide with the activation pulses of the power component 3, the voltage-time area being so low that the arc 15 will not be ignited in the event of a short circuit.

The change in resistance or a short circuit is determined and detected only during a pulse phase or pulsed voltage, detection being deactivated between pulses. Activation or deactivation of the function for determining and detecting a change in resistance is operated by the control system 4, 5 in synchronisation with activation of the power component 3.

Finally, it should be pointed out that the individual parts and components or component groups of the embodiments described as examples above are illustrated in a schematic and very simplified form. Furthermore, individual parts of the combinations of features described above in respect of the individual examples of embodiments may be used in combination with other individual features from other examples of embodiments and construed as independent solutions proposed by the invention.

Above all, the subject matter of the individual embodiments illustrated in FIGS. 1; 2, 3 can be construed as independent solutions proposed by the invention. The tasks and solutions proposed by the invention can be found in the detailed descriptions relating to these drawings.

List of Reference Numbers

1 Welding device
2 Current source
3 Power component
4 Control system
5 Switching element
6 Control valve
7 Supply line
8 Gas
9 Gas storage
10 Welding torch
11 Wire feed device
12 Supply line
13 Welding wire
14 Supply reel
15 Arc
16 Workpiece
17 Welding line
18 Welding line
19 Cooling circuit
20 Flow indicator
21 Water container
22 Input and/or output device
23 Hose pack
24 Connector device
25 Tension-relieving device
26 Housing
27 Output terminal
28 Output terminal
29 Line
30 Robot controller
31 Robot head
32 Seam
33 Line connection
34 Seam edge 35 Seam edge
36 Supply line
37 Supply line
38 Mains supply
39 Rectifier bridge
40 Transformer
41 Primary side
42 Secondary side
43 Rectifier bridge
44 Line
45 Line
46 Choke
47 Measuring device
48 Current sensor
49 Line
50 Line
51 Line
52 Line
53 Suppression and/or discharge capacitor
54 Suppression and/or discharge capacitor
55 Line

What is claimed is:

1. Method of positioning a welding torch and a welding wire of a welding device at the center of a desired path of a welding seam, in which the welding torch is positioned by means of a robot arm on a predetermined or programmed position between two seam edges of a workpiece, and an alignment process is run whereby the robot arm moves the welding torch in one direction until a short circuit occurs between the welding torch or the welding wire and one of the seam edges, and the welding torch is then displaced by the robot arm in the opposite direction until another short circuit occurs between the welding torch or the welding wire and the other one of the seam edges but no arc is ignited between the welding torch or welding wire and the workpiece when a short circuit occurs, after which a control system evaluates the displacement path in order to calculate the seam center on which the welding torch or welding wire is positioned by the robot arm, wherein the welding device uses a single current source having a power component supplying power for the welding process and the alignment process; by selecting a "Find position" function, the control system reduces the power output of the power component to the degree that a change in resistance is detected on the basis of the power applied to output terminals of the power component when a short circuit occurs and, to detect the short circuit, discharge capacitors between the output terminals are loaded by an output power of the power component with a low capacity so that ignition of an arc is prevented when a short circuit occurs.

2. Method as claimed in claim 1, wherein the power component supplies only a low power for keeping the discharge capacitors charged.

3. Method as claimed in claim 1, wherein by setting the "Find position" function, the control system activates the power component in such a way that the power component supplies sufficient output power on a secondary side to compensate for the lost power of the components of the secondary side and additionally a slight charge is applied to the suppression and/or discharge capacitors.

4. Method as claimed in claim 1, wherein when the alignment process has been completed by the control system, the power output of the power component is duly increased in order to generate a high output power and hence supply the energy for the welding process and to ignite the arc.

5. Method as claimed in claim 1, wherein when the alignment process has been run, the power component is activated by the control system with welding parameters previously entered by the user.

6. Method as claimed in claim 1, wherein a two-way data exchange is operated between the control system and a robot arm controller via a line connection.

7. Method of detecting a short circuit between a welding wire and a workpiece on completion of a welding process, a no-load voltage being applied to the welding wire, which breaks down in case of a short circuit, and the break down being detected by a control system, wherein the welding device used uses a single current source having a power component supplying power for the welding process and for detecting a short circuit on completion of the welding process, the power component is activated by the control system on completion of the welding process and after a predeterminable time has elapsed so that, when the short circuit is detected between the welding wire and the workpiece, a minimal output power is supplied or the power component is switched off, thereby preventing ignition of an arc and, to detect the short circuit, discharge capacitors between the output terminals are loaded by an output power of the power component with a low capacity so that ignition of an arc is prevented when a short circuit occurs.

8. Method as claimed in claim 7, wherein, if a short circuit is detected after a predeterminable time has elapsed, an increased current is delivered in order to resolve the short circuit or an error indication o signal is sent from the welding device (1) to a robot controller of the welding device.

9. A welding device comprising a welding torch and a welding wire, a robot arm carrying the welding torch for positioning the welding torch and welding wire on a predetermined or programmed position between two seam edges of a workpiece in an alignment process in which the robot arm moves the welding torch in one direction until a short circuit occurs between the welding torch or the welding wire and one of the seam edges, and the welding torch is then displaced by the robot arm in the opposite direction until another short circuit occurs between the welding torch or the welding wire and the other one of the seam edges but no arc is ignited between the welding torch or welding wire and the workpiece when a short circuit occurs; a single current source having a power component supplying power for the welding process and the alignment process; a controllable "Find position" function controlling the power component with a minimal output power when a short circuit occurs and ignition of an arc is prevented; and, to detect the short circuit, discharge capacitors connected to output terminals of the power component at a secondary side of the current source, the discharge capacitors being loadable by an output power of the power component with a low capacity whereby ignition of an arc is prevented when a short circuit occurs.

* * * * *